United States Patent
Ikemiya et al.

(10) Patent No.: US 9,134,058 B2
(45) Date of Patent: Sep. 15, 2015

(54) TRAILER REFRIGERATING APPARATUS

(75) Inventors: Makoto Ikemiya, Osaka (JP); Hisaaki Takaoka, Osaka (JP); Shigeto Tanaka, Osaka (JP)

(73) Assignee: DAIKEN INDUSTRIES, LTD., Osaka (JP)

( * ) Notice: Subject to any disclaimer, the term of this patent is extended or adjusted under 35 U.S.C. 154(b) by 297 days.

(21) Appl. No.: 13/375,795

(22) PCT Filed: Jun. 3, 2010

(86) PCT No.: PCT/JP2010/003713
§ 371 (c)(1),
(2), (4) Date: Dec. 2, 2011

(87) PCT Pub. No.: WO2010/140369
PCT Pub. Date: Dec. 9, 2010

(65) Prior Publication Data
US 2012/0085117 A1  Apr. 12, 2012

(30) Foreign Application Priority Data
Jun. 5, 2009 (JP) ................................. 2009-136623

(51) Int. Cl.
F25B 47/00 (2006.01)
F25B 47/02 (2006.01)
B60H 1/32 (2006.01)
F25D 19/00 (2006.01)

(52) U.S. Cl.
CPC ............ *F25B 47/022* (2013.01); *B60H 1/3232* (2013.01); *F25B 2400/0403* (2013.01); *F25B 2400/13* (2013.01); *F25B 2600/2501* (2013.01); *F25D 19/003* (2013.01)

(58) Field of Classification Search
CPC .... B60H 1/3232; F25D 19/003; F25D 21/006
USPC .................................. 62/277, 81, 244, 323.3
See application file for complete search history.

(56) References Cited

U.S. PATENT DOCUMENTS

| 2,762,206 | A | * | 9/1956 | Ashley | ............................. 62/81 |
| 4,178,767 | A | * | 12/1979 | Shaw | ............................. 62/155 |
| 5,115,644 | A | * | 5/1992 | Alsenz | ............................ 62/181 |
| 2006/0243257 | A1 | * | 11/2006 | Freund et al. | ................. 123/550 |
| 2009/0250190 | A1 | * | 10/2009 | Siegenthaler | ................... 165/42 |

FOREIGN PATENT DOCUMENTS

| JP | 56-68767 A | 6/1981 |
| JP | 63-34476 A | 2/1988 |
| JP | 2001-27465 A | 1/2001 |

(Continued)

*Primary Examiner* — Cheryl J Tyler
*Assistant Examiner* — Elizabeth Martin
(74) *Attorney, Agent, or Firm* — Birch, Stewart, Kolasch & Birch, LLP

(57) ABSTRACT

A refrigerant circuit is configured, which includes an electric compressor, a condenser, an expansion mechanism, an evaporator, a hot gas introduction path connecting the electric compressor and the evaporator together, and a switching valve for controlling a flow of refrigerant in the hot gas introduction path. In addition, a fan is provided. In a defrosting cycle for introducing refrigerant into the evaporator through the hot gas introduction path to defrost the evaporator, if the pressure of the condenser is equal to or lower than a predetermined threshold, the fan forms an air flow from a radiator to the condenser.

4 Claims, 9 Drawing Sheets

(56) References Cited

FOREIGN PATENT DOCUMENTS

| JP | 2001-330353 A | 11/2001 |
| JP | 2007-283174 A | 11/2007 |
| JP | 2008-221997 A | 9/2008 |

* cited by examiner

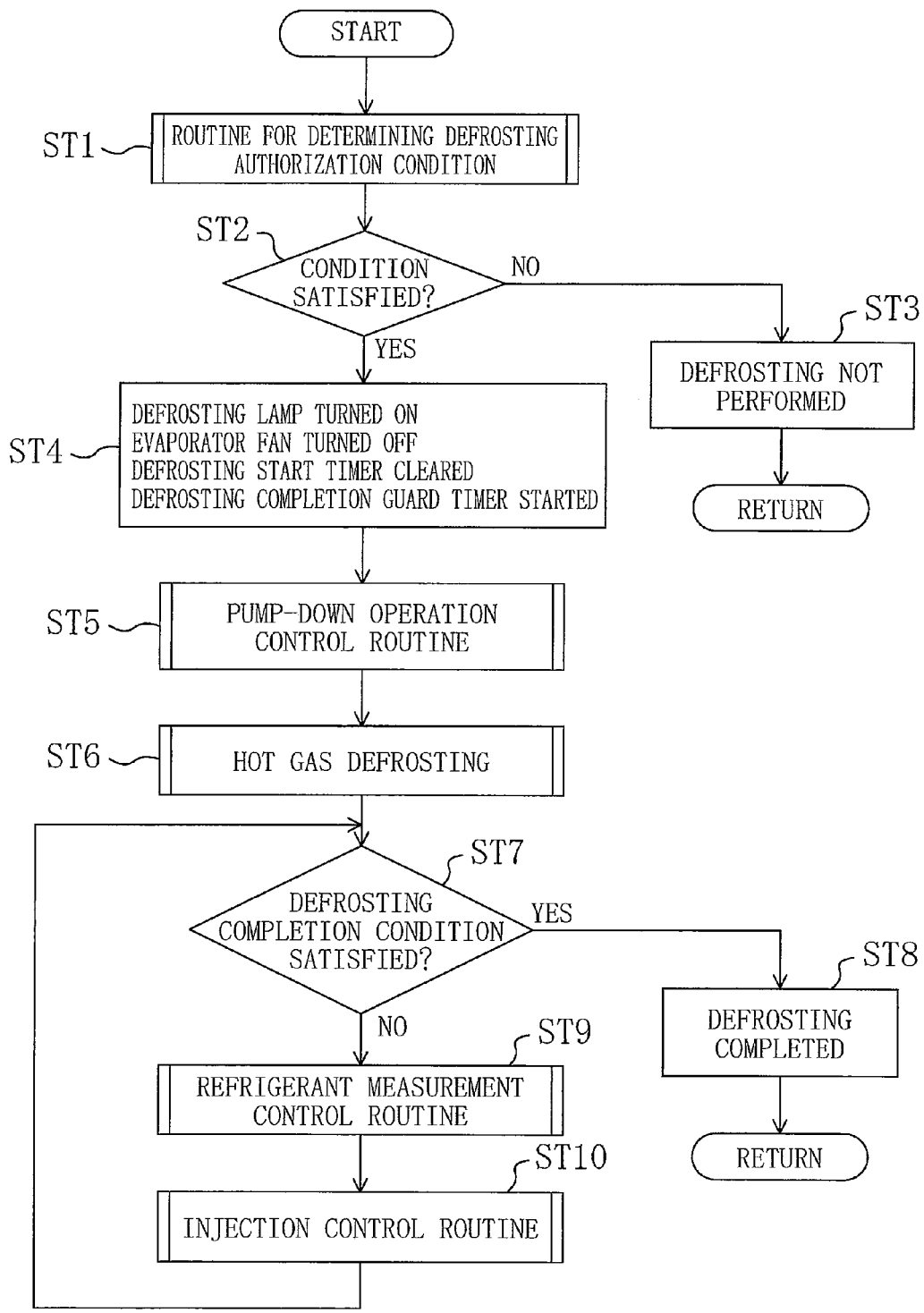

TRAILER REFRIGERATING APPARATUS

TECHNICAL FIELD

The present invention relates to a trailer refrigerating apparatus for cooling an in-compartment space of a trailer.

BACKGROUND ART

Conventionally, a refrigerating apparatus for cooling an inside of a compartment of, e.g., a refrigerator or a freezer has been known.

For example, Patent Document 1 discloses a refrigerating apparatus for cooling an inside of a compartment of a container used for, e.g., marine transportation. The refrigerating apparatus includes a refrigerant circuit in which a compressor, a condenser, an expansion valve, and a cooling heat exchanger (evaporator) are connected together. In the refrigerant circuit of the refrigerating apparatus, refrigerant circulates to perform a vapor compression refrigeration cycle. As a result, refrigerant flowing through the cooling heat exchanger is evaporated by absorbing heat from in-compartment air, thereby cooling the in-compartment air. In the refrigerating apparatus, a freezing operation in which in-compartment air is set to have a temperature lower than zero degrees Celsius to freeze stored products in the container and a refrigerating operation in which in-compartment air is set to have a temperature higher than zero degrees Celsius to refrigerate the stored produces in the container are allowed.

In the refrigerating apparatus of this type, since in-compartment air has the temperature lower than zero degrees Celsius in the freezing operation, moisture contained in the in-compartment air is adhered to a surface of the cooling heat exchanger as frost. As an amount of frost adhered to the cooling heat exchanger is increased, a cooling capacity is reduced. Thus, a defrosting operation is performed in order to avoid such reduction of the cooling capacity. In a refrigerating apparatus for a marine container, a refrigerant circulation cycle (referred to as a "hot gas defrosting cycle" or simply referred to as a "defrosting cycle") in which discharge refrigerant gas from a compressor is sent to an evaporator and is returned to the compressor has been typically employed, and frost adhered to a cooling heat exchanger is melted by heat of the discharge refrigerant gas.

CITATION LIST

Patent Document

Patent Document 1: Japanese Patent Publication No. 2007-283174

SUMMARY OF THE INVENTION

Technical Problem

In, e.g., a case where an ambient temperature is equal to or lower than a certain temperature level in the hot gas defrosting cycle, there is a possibility that, even if a fan (outside-compartment fan) for the condenser is stopped, the pressure of the condenser is decreased and refrigerant flows toward the condenser. As in the foregoing, when refrigerant flows toward the condenser, an amount of refrigerant flowing into the evaporator is decreased, resulting in degradation of defrosting performance.

In particular, in a trailer refrigerating apparatus mounted in a refrigerated vehicle for transporting frozen food, fresh food, etc. by road or rail, there is a possibility that heat of a condenser is removed by a traveling air stream generated while the refrigerated vehicle travels and the pressure of the condenser is further decreased even if an outside-compartment fan is stopped. Facing the foregoing problem, a discharge pressure adjusting valve may be provided between the compressor and the condenser to prevent refrigerant from flowing toward the condenser as in, e.g., Patent Document 1. However, the mounting of the discharge pressure adjusting valve is a cause of an cost increase.

The present invention has been made in view of the foregoing problem, and it is an objective of the present invention to supply a sufficient amount of refrigerant to an evaporator (25) in a defrosting cycle in a trailer refrigerating apparatus.

Solution to the Problem

In order to solve the foregoing problem, a first aspect of the invention is intended for a trailer refrigerating apparatus for cooling an in-compartment space (13) of a trailer (11), which includes a refrigerant circuit (21) which includes an electric compressor (22), a condenser (23), an expansion mechanism (24), an evaporator (25), a hot gas introduction path (123) connecting the electric compressor (22) and the evaporator (25) together, and a switching valve (143) for controlling a flow of refrigerant in the hot gas introduction path (123), and which allows a refrigerating cycle for evaporating refrigerant in the evaporator (25) to cool the in-compartment space (13) and a defrosting cycle for introducing refrigerant into the evaporator (25) through the hot gas introduction path (123) to defrost the evaporator (25); a generator (40) configured to supply power to the electric compressor (22); an engine (41) configured to drive the generator (40); a radiator (45) configured to dissipate heat of the engine (41); and a fan (26) configured to, when the defrosting cycle is performed, if a pressure of the condenser (23) is equal to or lower than a predetermined threshold, form an air flow from the radiator (45) to the condenser (23).

According to the foregoing configuration, the refrigerating cycle for cooling the in-compartment space (13) and the defrosting cycle for introducing refrigerant into the evaporator (25) through the hot gas introduction path (123) to defrost the evaporator (25) are performed. When the defrosting cycle is performed, if the pressure of the condenser (23) is equal to or lower than the predetermined threshold, the outside-compartment fan (26) forms the air flow from the radiator (45) to the condenser (23). This increases the temperature of the condenser (23), thereby increasing the pressure of refrigerant in the condenser (23). When the pressure of the condenser (23) is increased and becomes much higher than that of the defrosting pipe (123), refrigerant (hot gas) discharged from the electric compressor (22) is less likely to flow toward the condenser (23) and is likely to flow toward the evaporator (25). Then, the hot gas flows into the evaporator (25), thereby removing frost adhered to the evaporator (25).

A second aspect of the invention is intended for the trailer refrigerating apparatus of the first aspect of the invention, in which the fan (26) is also used as an outside-compartment fan (26) configured to form a flow of outside-compartment air toward the condenser (23).

According to the foregoing configuration, when the defrosting cycle is performed, the outside-compartment fan (26) forms the air flow from the radiator (45) to the condenser (23).

A third aspect of the invention is intended for the trailer refrigerating apparatus of the first aspect of the invention, which further includes an engine control section (150) configured to control a rotational speed of the engine (41) so that a pressure of refrigerant in the condenser (23) is equal to or higher than a predetermined value.

According to the foregoing configuration, in, e.g., a case where the pressure of refrigerant in the condenser (23) is relatively low, the controller (150) controls the rotational speed of the engine (41), thereby increasing the temperature of the radiator (45). This increases the temperature of air sent from the radiator (45) to the condenser (23), and, as a result, the temperature of the condenser (23) is also increased. Thus, the pressure of refrigerant in the condenser (23) is increased.

Advantages of the Invention

According to the first aspect of the invention, since the pressure of refrigerant in the condenser (23) is increased in the defrosting cycle, the amount of refrigerant flowing from the electric compressor (22) to the condenser (23) can be decreased. That is, the sufficient amount of refrigerant can be supplied to the evaporator (25) in the defrosting cycle, thereby realizing efficient defrosting. A sufficient heating capacity can be expected in, e.g., a case where, while the a vehicle travels, the trailer (11) is exposed to a traveling air stream and the traveling air stream is introduced into the condenser (23), or a case where an ambient temperature is decreased.

In the first aspect of the invention, a discharge pressure adjusting valve is not required, which should be mounted between a compressor and a condenser in a conventional trailer refrigerating apparatus. That is, in the trailer refrigerating apparatus, cost reduction can be also expected.

According to the second aspect of the invention, the outside-compartment fan (26) typically provided in a refrigerating apparatus can be used to form the air flow from the radiator (45) to the condenser (23). Thus, a cost increase is reduced while realizing the efficient defrosting.

According to the third aspect of the invention, the amount of heat sufficiently heating the condenser (23) can be obtained by the radiator (45). Thus, the requisite amount of refrigerant (hot gas) flowing into the evaporator (25) can be ensured, thereby sufficiently defrosting the evaporator (25).

BRIEF DESCRIPTION OF THE DRAWINGS

FIG. 9 is a flowchart illustrating a process during a hot gas defrosting operation.

DESCRIPTION OF EMBODIMENTS

An embodiment of the present invention will be described below with reference to the drawings. Note that the embodiment described below will be set forth merely for purposes of preferred examples in nature, and is not intended to limit the present invention or the applications or scope thereof.

<<Summary of the Embodiment>>

Figure 1:
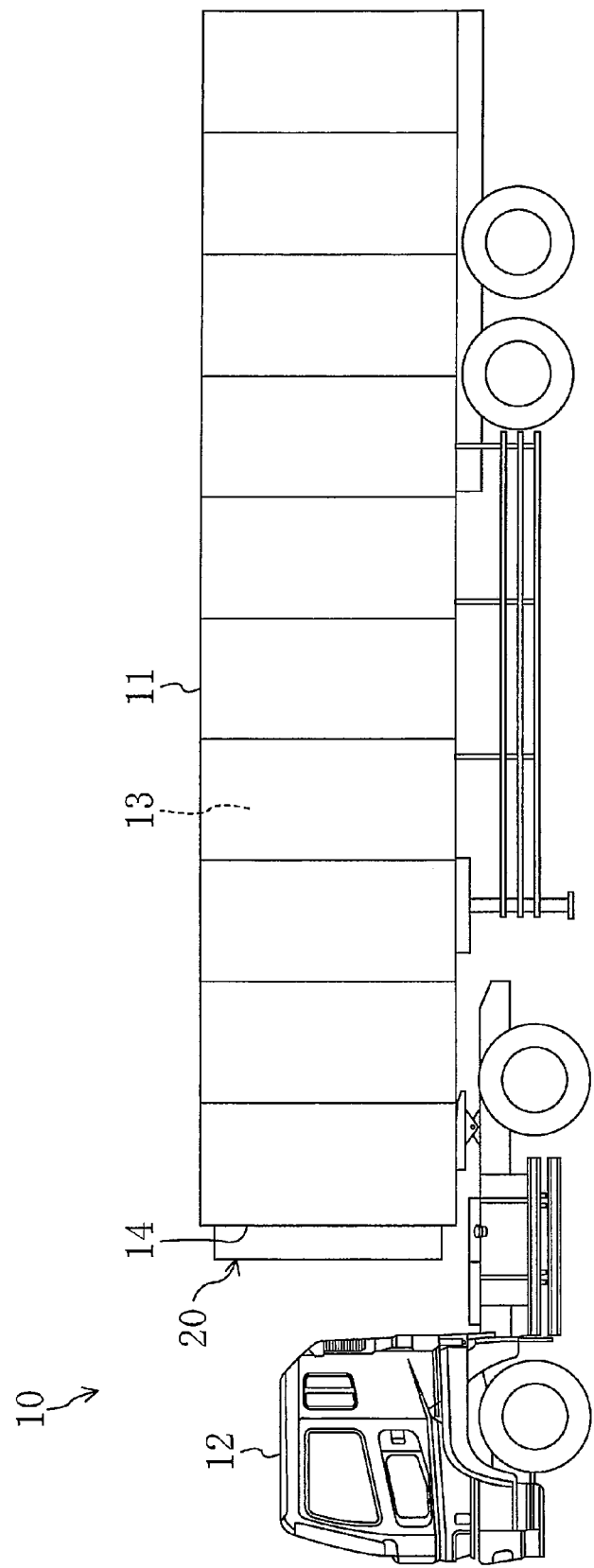
FIG. 1 is a view of an entire configuration of a refrigerated vehicle and a trailer refrigerating apparatus.

A trailer refrigerating apparatus of the present embodiment is mounted in a refrigerated vehicle for transporting frozen food, fresh food, etc. by road or rail. FIG. 1 is a view of an entire configuration of a refrigerated vehicle (10) and a trailer refrigerating apparatus (20). The refrigerated vehicle (10) includes a trailer (11) in which freight such as frozen food is stored, and a tractor (12) for towing the trailer (11).

Figure 2:
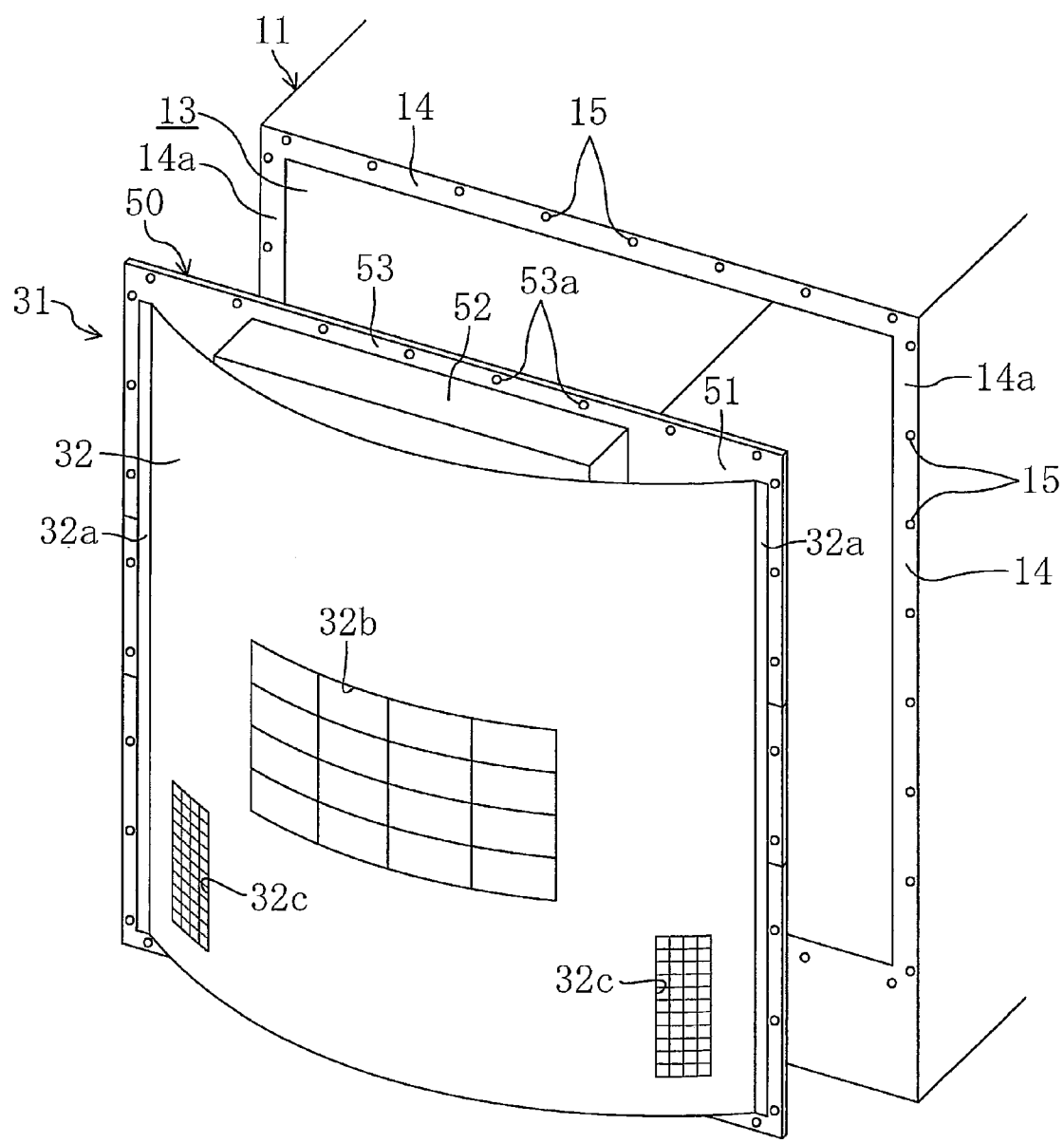
FIG. 2 is a perspective view illustrating an entire configuration of an open section of a trailer and the trailer refrigerating apparatus.

The trailer (11) is formed in an elongated rectangular parallelepiped box shape extending in a longitudinal direction and opening at a front end. An in-compartment space (13) is formed inside the trailer (11), and frozen food, fresh food, etc. are stored in the in-compartment space (13). As illustrated in FIG. 2, a rectangular frame-shaped open section (14) is formed at the front end of the trailer (11). A plurality of screw fixing sections (15) for attaching the trailer refrigerating apparatus (20) are formed in a front end surface of the open section (14). For example, eight of the plurality of screw fixing sections (15) are arranged at equal intervals in each of four sides of the open section (14). A configuration of the trailer refrigerating apparatus (20) will be described below in detail.

Configuration of Trailer Refrigerating Apparatus (20)

Figure 3:
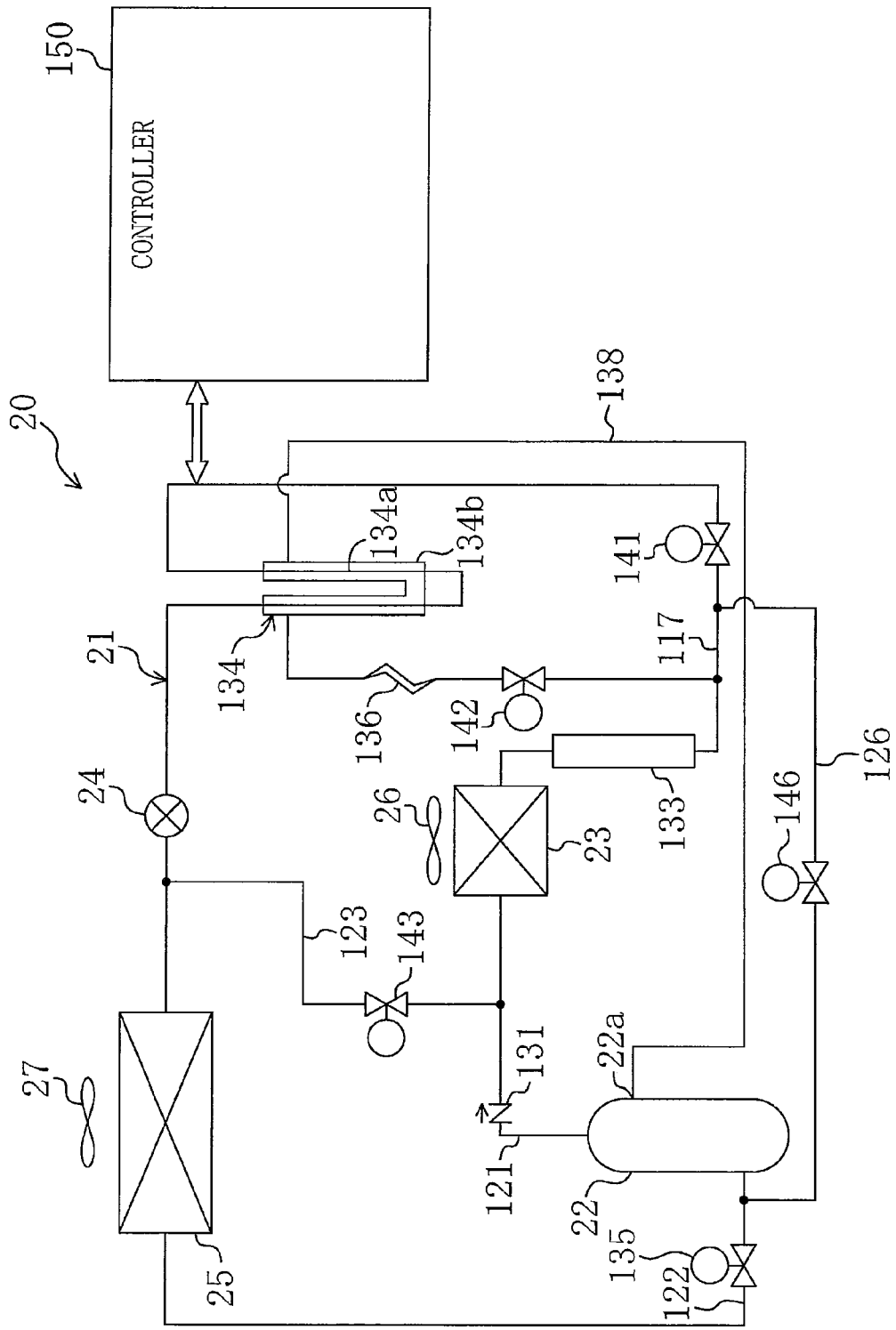
FIG. 3 is a schematic configuration diagram of a refrigerant circuit of the trailer refrigerating apparatus.

The trailer refrigerating apparatus (20) serves as a cooling apparatus for cooling air in the in-compartment space (13) of the refrigerated vehicle (10). FIG. 3 is a schematic configuration diagram of a refrigerant circuit of the trailer refrigerating apparatus. As illustrated in FIG. 3, the trailer refrigerating apparatus (20) includes a refrigerant circuit (21) filled with refrigerant.

Configuration of Refrigerant Circuit (21)

In the refrigerant circuit (21), an electric compressor (22), a condenser (23), an expansion valve (24), and an evaporator (25) are connected together as main components. The refrigerant circuit (21) is a refrigerant circuit which allows a refrigerating cycle in which refrigerant is evaporated in the evaporator (25) to cool the in-compartment space (13) and a defrosting cycle in which refrigerant is introduced into the evaporator (25) to defrost the evaporator (25).

The electric compressor (22) is a fixed capacity type scroll compressor in which a rotational speed of a compressor motor is maintained constant. The condenser (23) is arranged outside a compartment, and is a so-called "air cooling condenser." An outside-compartment fan (26) for forming the flow of outside-compartment air toward the condenser (23) is provided near the condenser (23). In the condenser (23), heat is exchanged between outside-compartment air and refrigerant.

The expansion valve (24) is an electronic expansion valve, the degree of opening of which is adjustable. The expansion valve (24) is controlled so that the degree of opening of the expansion valve (24) is adjusted depending on the degree of superheating of refrigerant flowing out from the evaporator (25) and the degree of superheating is reduced as much as possible.

The evaporator (25) is arranged inside the compartment of the trailer (11), and serves as a cooling heat exchanger for cooling the inside of the compartment. An in-compartment fan (27) for circulating air of the in-compartment space (13) and sending in-compartment air to the evaporator (25) is provided near the evaporator (25). In the evaporator (25), heat is exchanged between in-compartment air sent by the in-compartment fan (27) and refrigerant.

An outlet pipe (121) of the electric compressor (22) is connected to an inlet end of the condenser (23) through a check valve (131). An outlet end of the condenser (23) is connected to the expansion valve (24) through a receiver (133), a first solenoid valve (liquid solenoid valve) (141), and a high-pressure flow path (liquid path) (134a) of a supercooling heat exchanger (economizer heat exchanger) (134). An inlet pipe (122) of the electric compressor (22) is connected to an outlet end of the evaporator (25) through an inlet proportional valve (135). An inlet end of the evaporator (25) is connected to the expansion valve (24).

The supercooling heat exchanger (134) exchanges heat between refrigerant flowing through the high-pressure flow path (134a) connected to a liquid pipe (117) of the refrigerant circuit (21) and refrigerant flowing through a low-pressure flow path (gas path) (134b) branched from the liquid pipe (117) and provided with a later-described pressure reduction mechanism. An inlet end of the low-pressure flow path (134b) is connected to a pipe between the receiver (133) and the first solenoid valve (141) through a capillary tube (136) which is the pressure reduction mechanism and a second solenoid valve (economizer solenoid valve) (142). In addition, an outlet end of the low-pressure flow path (134b) is connected to a middle inlet port (22a) of the electric compressor (22). The middle inlet port (22a) is communicated with a compression mechanism of the electric compressor (22) in a position in the middle of refrigerant compression (position under a lower pressure).

The inlet proportional valve (135) is a flow rate adjusting valve for adjusting an amount of refrigerant to be sucked into the electric compressor (22) to adjust a refrigerant circulation amount in the refrigerant circuit (21). That is, the inlet proportional valve (135) serves as a capacity adjusting unit for adjusting the refrigerant circulation amount to adjust a cooling capacity of the evaporator (25). The inlet proportional valve (135) is controlled (proportionally controlled) so that a refrigerant flow rate in the refrigerant circuit (21) is adjusted in a PI control and an in-compartment temperature (blow-off temperature) is maintained within a range of, e.g., ±0.5° C. of a predetermined temperature. Specifically, the degree of opening of the inlet proportional valve (135) is adjusted in a closing direction when the in-compartment temperature falls below a preset temperature, whereas the degree of opening of the inlet proportional valve (135) is adjusted in an opening direction when the in-compartment temperature exceeds the preset temperature. The inlet proportional valve (135) is intended for a feedback control.

In the refrigerant circuit (21), a defrosting pipe (123) and a liquid injection pipe (126) are also connected.

The defrosting pipe (123) is a pipe for a defrosting operation in which discharge refrigerant from the electric compressor (22) is introduced into the evaporator (25) to melt frost adhered to the evaporator (25). One end of the defrosting pipe (123) is connected between the check valve (131) and the condenser (23), and the other end of the defrosting pipe (123) is connected between the expansion valve (24) and the evaporator (25). In addition, in the defrosting pipe (123), a third solenoid valve (hot gas solenoid valve) (143) opened in the defrosting operation is provided. That is, the third solenoid valve (143) controls the flow of refrigerant through the defrosting pipe (hot gas introduction path) (123). The third solenoid valve (143) is an example of a switching valve of the present invention.

The liquid injection pipe (126) is a pipe for so-called "liquid injection," i.e., for returning liquid refrigerant condensed in the condenser (23) to an inlet side of the electric compressor (22). One end of the liquid injection pipe (126) is connected between the receiver (133) and the first solenoid valve (141), and the other end of the liquid injection pipe (126) is connected between the inlet proportional valve (135) and the electric compressor (22). In the liquid injection pipe (126), a fifth solenoid valve (injection solenoid valve) (146) opened depending on operational conditions is provided.

The trailer refrigerating apparatus (20) includes a controller (150) as a control unit. The controller (150) is accommodated in a second electric component box (44) which will be described later.

The controller (150) of the present embodiment controls the refrigerant circuit (21) based on the preset temperature inside a container compartment. In addition, the controller (150) controls the refrigerant circuit (21) in a hot gas defrosting operation in which the defrosting pipe (123) is used to defrost the evaporator (25) or a heating operation in which hot gas is supplied to the evaporator (25) to heat the inside of the compartment under a condition where a temperature outside the compartment is equal to or lower than zero degrees. Note that the controller (150) is configured so as to control a rotational speed of an engine (41) which will be described later.

In the foregoing configuration, the defrosting pipe (123) forms the hot gas introduction path through which discharge refrigerant gas from the electric compressor (22) is introduced into the evaporator (25). In addition, the liquid injection pipe (126) is for introducing liquid refrigerant into the inlet side of the electric compressor (22) when a high pressure in a refrigeration cycle is increased to a higher level in a hot gas introduction operation for introducing hot gas into the evaporator (25), such as the hot gas defrosting operation or the heating operation. Further, the low-pressure flow path (134b) of the supercooling heat exchanger (134) is the gas path, and is connected to a gas injection path (138) through which refrigerant gas is introduced into the electric compressor (22) when the discharge temperature of refrigerant falls below a predetermined value by performing the liquid injection in the hot gas introduction operation.

Casing Unit (31)

As illustrated in FIG. 2, the trailer refrigerating apparatus (20) includes a casing unit (31) attached to the open section (14) of the trailer (11). The casing unit (31) includes a front cover (32), an outside-compartment casing (50), and an in-compartment casing (33) (see FIG. 4).

<Front Cover (32)>

The front cover (32) is detachable from a front surface of the outside-compartment casing (50). The front cover (32) is a plate-shaped member which is curved so that a middle portion of the front cover (32) in a width direction thereof (horizontal direction as viewed in FIG. 2) protrudes toward front. Side portions (32a) at both ends of the front cover (32) in the width direction thereof are held by the outside-compartment casing (50). This forms machine chambers (35, 36) (see FIG. 5) in each of which various components (details will be described later) are accommodated, between a rear surface of the front cover (32) and the front surface of the outside-compartment casing (50).

A single middle inlet (32b) and two side inlets (32c) are provided in the front cover (32). The middle inlet (32b) is formed in substantially the center of the front cover (32). One of the side inlets (32c) is formed closer to a bottom and a left end of the front cover (32), and the other side inlet (32c) is formed closer to the bottom and a right end of the front cover (32).

Although not shown in the figure, a plurality of doors for maintenance of the trailer refrigerating apparatus (20) are provided in the front cover (32). Specifically, the plurality of doors are provided in, e.g., a portion of the front cover (32), which faces a generator (40) or the engine (41) which will be described later, a portion of the front cover (32), which faces a first electric component box (43), and a portion of the front cover (32), which faces the second electric component box (44).

<Outside-Compartment Casing (50)>

The outside-compartment casing (50) is provided outside the trailer (11). The outside-compartment casing (50) is made of aluminum material. The outside-compartment casing (50) includes a square plate-shaped base (51) and a protruding portion (52) formed in an upper part of the base (51) (see FIGS. 2, 4, and 5).

The base (51) is configured by connecting three separate bodies (51a, 51b, 51c) together in a vertical direction. That is, the base (51) includes the lower base portion (51a) provided closer to a bottom of the base (51), the upper base portion (51b) provided closer to a top of the base (51), and the middle base portion (51c) positioned between the lower base portion (51a) and the upper base portion (51b).

A plurality of bolt holes (53a) into each of which a bolt (16) is inserted are formed in an outer edge portion (53) of the base (51). For example, eight of the plurality of bolt holes (53a) are arranged at equal intervals in each of four sides of the outer edge portion (53) of the base (51). The bolts (16) each inserted into the bolt hole (53a) are screwed in the screw fixing sections (15) in a state in which the outer edge portion (53) of the base (51) and the open section (14) of the trailer (11) closely contact each other, thereby fixing the outside-compartment casing (50) to the trailer (11).

Figure 5:
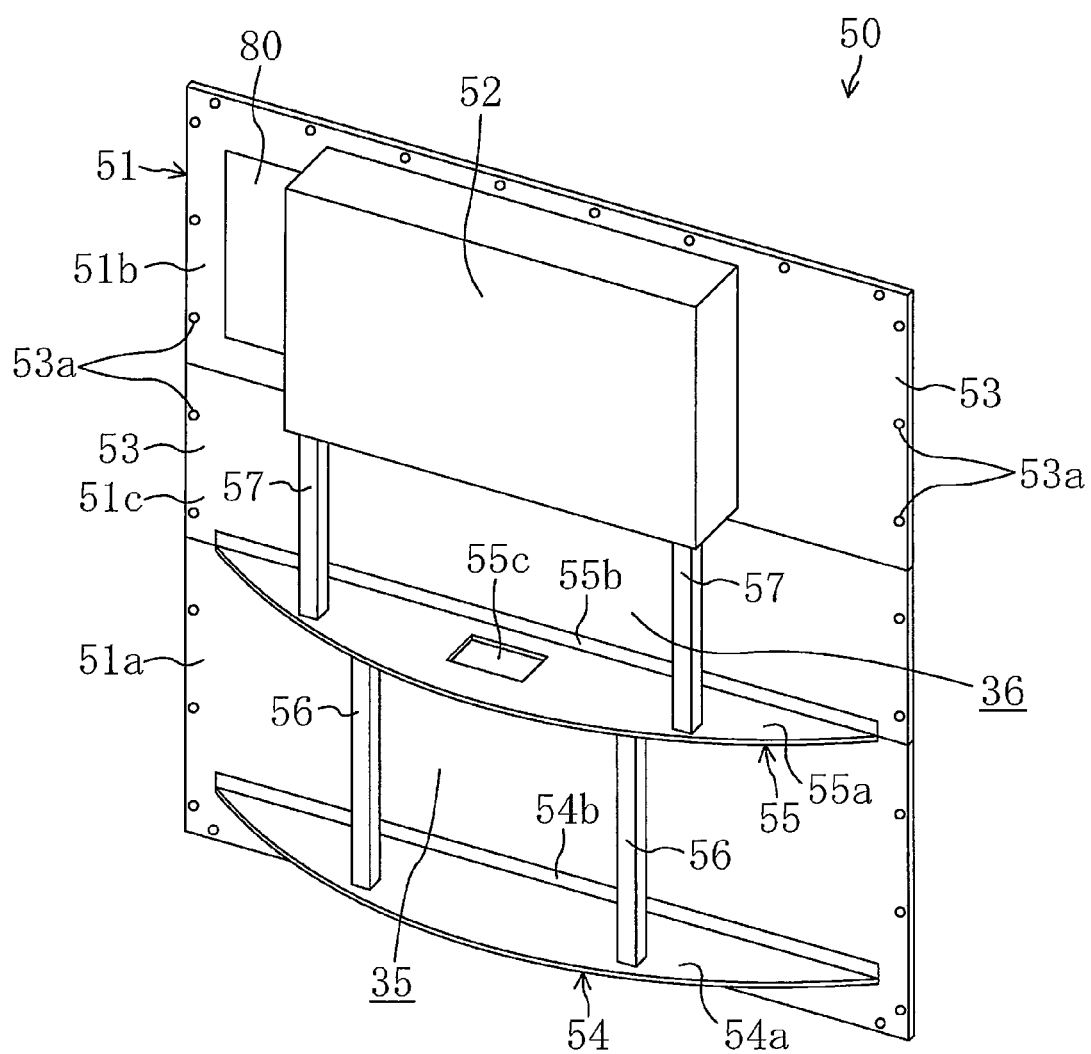
FIG. 5 is a perspective view of an outside-compartment casing.

In a state in which the outside-compartment casing (50) is fixed to the trailer (11), the open section (14) of the trailer (11) is closed by the outside-compartment casing (50). That is, the outside-compartment casing (50) functions as a closing member of the open section (14) of the trailer (11). When the open section (14) is closed, a ventilation port cannot be provided across an entire surface of a trailer as in a conventional refrigerated vehicle. Thus, in the present embodiment, a ventilation port (80) is provided to ventilate the compartment as illustrated in FIG. 5. Specifically, the ventilation port (80) is formed in a left part of the upper base portion (51b) as viewed in FIG. 5. The ventilation port (80) is openable by a motor, and is communicated with the compartment of the trailer (11) when the ventilation port (80) is opened. Opening/closing of the ventilation port (80) (control of the motor) is controlled by an operation panel (44a) which will be described later.

In addition, in the state in which the outside-compartment casing (50) is fixed to the trailer (11), the open section (14) of the trailer (11) is reinforced by the outer edge portion (53) of the outside-compartment casing (50). That is, the outside-compartment casing (50) also functions as a reinforcing member of the open section (14) of the trailer (11).

The protruding portion (52) is made of aluminum material so as to be integrally formed with the base (51), and protrudes from the base (51) toward front. The protruding portion (52) is formed in a rectangular parallelepiped box shape which has flat front and rear surfaces and opens on a rear surface side (see FIG. 4). Note that the protruding portion (52) may be made of, e.g., resin material, and may be integrally connected to the base (51).

The outside-compartment casing (50) includes a lower plate (54) and an upper plate (55). The lower plate (54) is provided closer to a lower end of the base (51), and the upper plate (55) is provided in a middle portion of the base (51) in the vertical direction (provided between the lower plate (54) and the protruding portion (52)). Each of the plates (54, 55) includes an arch-shaped supporting plate portion (54a, 55a). The supporting plate portion (54a, 55a) defines an arc-shaped surface on a front side, and defines a flat surface along a front surface of the base (51) on a rear side. Each of the plates (54, 55) includes a bent portion (54b, 55b) formed by upwardly bending the supporting plate portion (54a, 55a) at a rear end thereof. The bent portion (54b, 55b) is formed in a plate shape extending in the horizontal direction. The bent portion (54b, 55b) is fasten on the base (51) with rivets, thereby fixing each of the plates (54, 55) to the base (51). A communication port (55c) is provided in a middle part of the supporting plate portion (55a) of the upper plate (55) in the horizontal direction.

In the state in which the front cover (32) is attached to the outside-compartment casing (50), the first machine chamber (35) is defined between the lower plate (54) and the upper plate (55). In addition, the second machine chamber (36) is defined above the upper plate (55). The first machine chamber (35) and the second machine chamber (36) are communicated with each other through the communication port (55c) of the upper plate (55). In addition, the first machine chamber (35) is communicated with the two side inlets (32c), and the second machine chamber (36) is communicated with the middle inlet (32b).

The outside-compartment casing (50) includes two lower pillars (56) and two upper pillars (57). The lower pillars (56) are interposed between the lower plate (54) and the upper plate (55). The upper pillars (57) are interposed between the upper plate (55) and the protruding portion (52). Each of the pillars (56, 57) is made of aluminum material, and is formed in a vertically extending prism shape.

Figure 6:
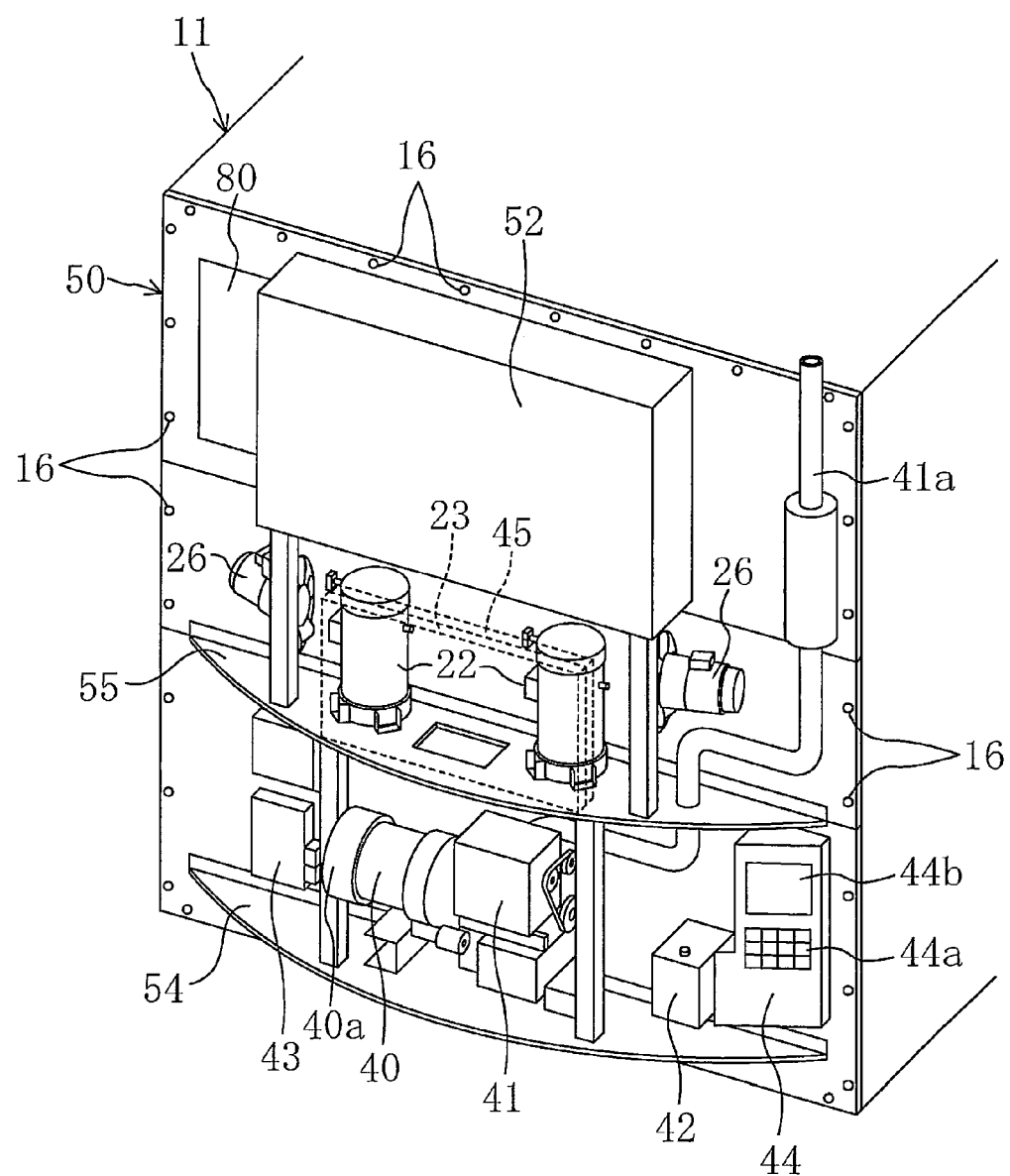
FIG. 6 is a perspective view illustrating the trailer refrigerating apparatus in a state in which a front cover is detached.

As illustrated in FIG. 6, in the first machine chamber (35), the generator (40), the engine (41), a battery (42), the plurality of electric component boxes (43, 44) are provided. Specifically, in the first machine chamber (35), the generator (40) and the engine (41) are mounted in a middle position of the lower plate (54) in the horizontal direction.

The engine (41) is for driving the generator (40). The rotational speed of the engine (41) is controlled by the controller (150). That is, the controller (150) is an example of an engine control section of the present invention. In this example, a signal (pressure signal) representing the pressure of refrigerant in the condenser (23) and a signal (water temperature signal) representing the water temperature of a radiator (45) (described later) for cooling the engine (41) are input to the controller (150), and the controller (150) controls the rotational speed of the engine (41) based on such signals.

An exhaust muffler (41a) is provided in the engine (41). As illustrated in FIG. 6, the exhaust muffler (41a) extends toward the right of the engine (41), and then upwardly extends through the upper plate (55) before the exhaust muffler (41a) reaches the second electric component box (44). A muffler body of the exhaust muffler (41a) is positioned in a space closer to an upper right side in the second machine chamber (36). That is, the exhaust muffler (41a) is in a position apart from the ventilation port (80), and therefore exhaust air from the exhaust muffler (41a) does not enter the ventilation port (80).

The generator (40) is for generating power for driving the electric compressor (22) etc. A generator cooling fan (40a) is provided in the generator (40). The generator cooling fan (40a) is attached to a rear end (end on a side opposite to an end to which the engine (41) is connected) of the generator (40), and rotates together with a drive shaft of the generator (40). That is, the generator cooling fan (40a) rotates in synchronism with the engine (41). The generator cooling fan (40a) cools the generator (40) by sucking air from a space at the rear end of the generator (40) and sending the air to the generator (40).

In the first machine chamber (35), the first electric component box (43) is provided in a space at the left of the generator (40), and the second electric component box (44) is provided in a space at the right of the engine (41). An inverter section (not shown in the figure) is accommodated in the first electric component box (43). The inverter section includes a converter circuit and an inverter circuit, and such circuits convert power output from the generator (40) into AC power having predetermined voltage and a predetermined frequency and supplies the AC power to the electric compressor (22) etc.

The operation panel (44a) and a display (44b) are provided in the second electric component box (44). The operation panel (44a) includes setting switches for various settings performed by a user, and the display (44b) displays various information such as an error code when a failure is caused. The opening/closing of the ventilation port (80) can be controlled by the switches of the operation panel (44a). The foregoing configuration is user-friendly because the switches etc. to be operated by the user are arranged so as to be concentrated. If a failure location can be identified based on the error code displayed in the display (44b) when the failure is caused, user-friendliness is enhanced by opening/closing only one of the doors of the front cover (32) closest to the failure location.

On the other hand, in the second machine chamber (36), the two electric compressors (22), the condenser (23), the radiator (45), and the two outside-compartment fans (26) are provided.

More specifically, in the second machine chamber (36), the two electric compressors (22) are mounted in a middle position of the upper plate (55) in the horizontal direction. In addition, the radiator (45) and the condenser (23) are arranged in the front of the electric compressors (22). The condenser (23) is arranged between the two upper pillars (57). The middle inlet (32b) of the front cover (32) is positioned in the front of the condenser (23). The radiator (45) is arranged in the rear of the condenser (23), and serves as an air-cooling radiator for dissipating heat from the engine (41). Note that, in the trailer refrigerating apparatus (20), refrigerant pipes (e.g., the outlet pipe (121) connecting the electric compressor (22) and the condenser (23) together) forming the refrigerant circuit (21) are arranged so as to be concentrated in an upper left space of the second machine chamber (36).

The two outside-compartment fans (26) are arranged so as to sandwich the two electric compressors (22). One of the two outside-compartment fans (26) is arranged closer to a left end of the upper plate (55), and the other outside-compartment fan (26) is arranged closer to a right end of the upper plate (55). Each of the outside-compartment fans (26) is a so-called "propeller fan," and a rotation shaft thereof extends in the horizontal direction. A propeller is connected to an end portion of the rotation shaft of the outside-compartment fan (26) closer to the electric compressor (22), and a motor is connected to an opposite end portion. The outside-compartment fan (26) is configured so that normal rotation and reverse rotation are allowed, and a control of a rotational direction is controlled by the controller (150).

More specifically, when the refrigerating cycle for cooling the in-compartment space (13) is performed in the refrigerant circuit (21), the outside-compartment fan (26) rotates in a normal direction. In the present embodiment, the middle inlet (32b) of the front cover (32) is positioned in the front of the condenser (23). When the outside-compartment fan (26) rotates in the normal direction, the flow of outside-compartment air from the middle inlet (32b) of the front cover (32) to the condenser (23) is formed (see FIGS. 4 and 8). Note that air passing through the condenser (23) further passes through the radiator (45), thereby cooling the radiator (45).

Figure 4:
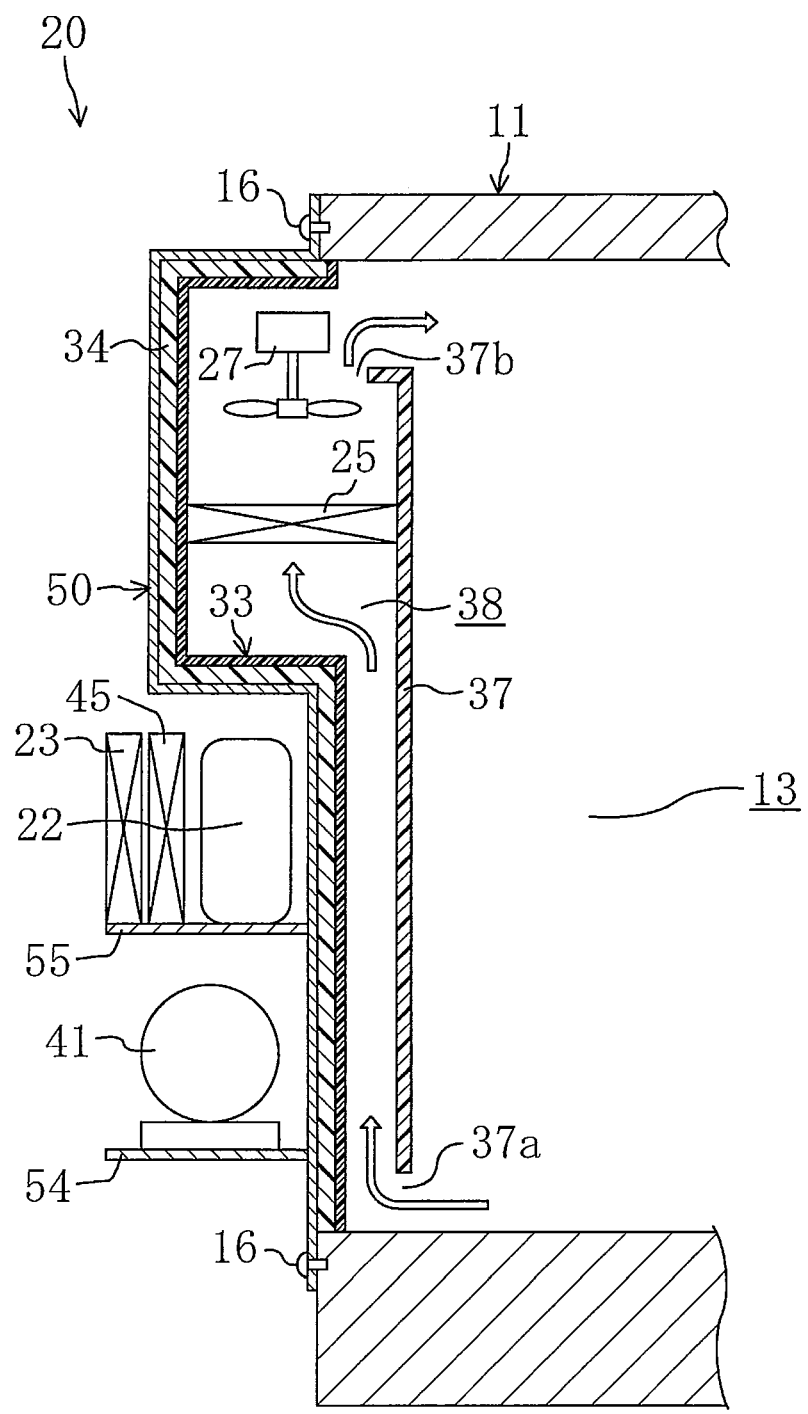
FIG. 4 is a longitudinal sectional view illustrating a schematic configuration of the trailer refrigerating apparatus.

On the other hand, when the defrosting cycle for defrosting the evaporator (25) is performed in the refrigerant circuit (21), if the pressure of the condenser (23) is equal to or lower than a predetermined threshold, the outside-compartment fan (26) rotates in a reverse direction. In the present embodiment, since the radiator (45) is arranged in the rear of the condenser (23) as illustrated in FIG. 4, an air flow from the radiator (45) to the condenser (23) is formed when the outside-compartment fan (26) rotates in the reverse direction. Note that, as the threshold, a value much larger than the pressure of the defrosting pipe (123) in a case where sufficient refrigerant flows toward the defrosting pipe (123) in the defrosting cycle is selected.

<In-Compartment Casing (33)>

As illustrated in FIG. 4, the in-compartment casing (33) is provided on a rear surface side of the outside-compartment casing (50) so as to face the in-compartment space (13) of the trailer (11). The in-compartment casing (33) is made of, e.g., glass fiber reinforced plastic (FRP) material. Note that the in-compartment casing (33) may be made of, e.g., other rein material or metal material. The in-compartment casing (33) has a shape defined along a rear surface of the outside-compartment casing (50).

A predetermined clearance is formed between a front surface of the in-compartment casing (33) and the rear surface of the outside-compartment casing (50), and a thermal insulator (34) is formed between the in-compartment casing (33) and the outside-compartment casing (50). After an enclosed space is formed between the outside-compartment casing (50) and the in-compartment casing (33), the enclosed space is filled with foamed resin, thereby integrally forming the thermal insulator (34) with the casing unit (31).

A dividing member (37) is attached on a rear surface side of the in-compartment casing (33). The dividing member (37) is arranged so as to apart from each of a rear surface of the in-compartment casing (33), an upper inner wall of the trailer (11), and a lower inner wall of the trailer (11) with a predetermined distance. This forms an inlet port (37a) below the dividing member (37), and forms an outlet port (37b) above the dividing member (37). In addition, an internal air flow path (38) is formed between the in-compartment casing (33) and the dividing member (37) so as to extend from the inlet port (37a) to the outlet port (37b).

In the internal air flow path (38), the evaporator (25) and the in-compartment fan (27) are provided. On the rear surface side of the protruding portion (52), the evaporator (25) is arranged so as to extend from the in-compartment casing (33) and the dividing member (37), and is supported by the in-compartment casing (33). The in-compartment fan (27) is provided above the evaporator (25). Note that, if a duct (not shown in the figure) is provided between the in-compartment fan (27) and the ventilation port (80), more effective compartment ventilation is allowed by the in-compartment fan (27). In addition, when the trailer refrigerating apparatus (20) is in operation, even if the refrigerated vehicle (10) does not travel, the compartment ventilation is allowed.

<Attachment Structure of Casing>

Figure 7:
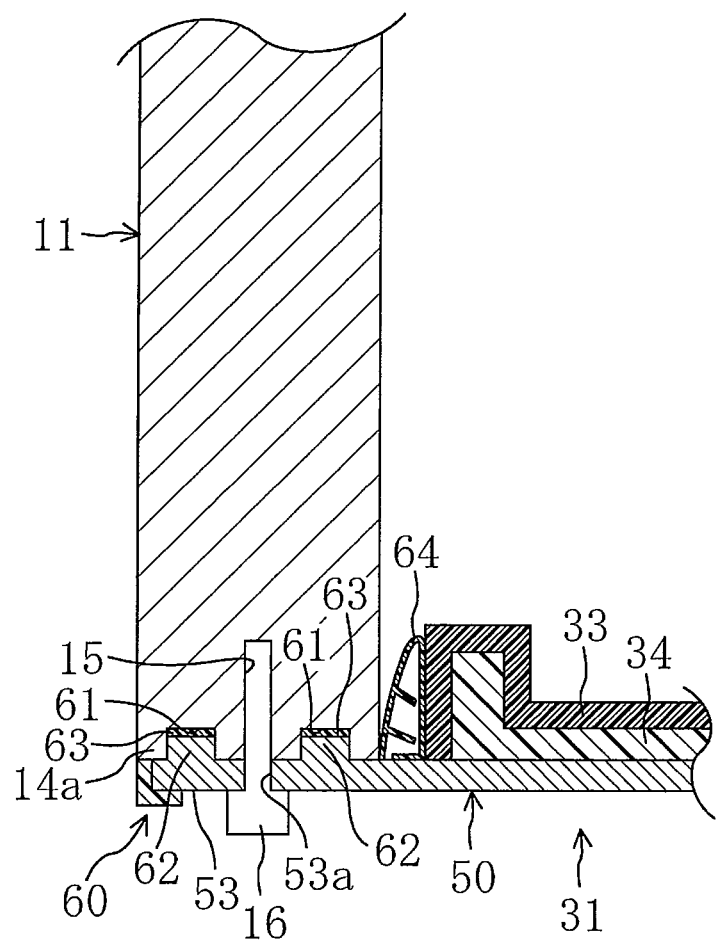
FIG. 7 is a view illustrating a cross section near a side edge portion of the open section of the trailer.

As described above, in the trailer refrigerating apparatus (20) of the present embodiment, the casing unit (31) is attached to the open section (14) of the trailer (11). An attachment structure of the casing unit (31) to the open section (14) of the trailer (11) will be described in detail with reference to FIG. 7. Note that FIG. 7 is an enlarged view illustrating a horizontal section near a side edge portion (14a) (see FIG. 2) on each of right and left sides of the trailer (11) in a width direction thereof.

In an attachment portion (60) of the side edge portion (14a) on each side of the open section (14) of the trailer (11) to the casing unit (31), two grooves (61) are formed in the trailer (11), and two raised portions (62) are formed in the casing unit (31).

The groove (61) vertically extends from an upper edge portion to a lower edge portion of the open section (14) of the trailer (11), and is formed so as to have a rectangular horizontal section. The two grooves (61) extend parallel to each other with a predetermined clearance.

On the other hand, the two raised portions (62) to be engaged with the grooves (61) are formed in the outside-compartment casing (50) of the casing unit (31). The raised portion (62) vertically extends from an upper end to a lower end of the outside-compartment casing (50), and is formed so as to have a rectangular horizontal section. The two raised portions (62) extend parallel to each other with a predetermined clearance. That is, the raised portion (62) has a shape corresponding to the groove (61) of the trailer (11), and is engaged with the groove (61) upon the attachment of the open section (14) of the trailer (11) to the casing unit (31).

The bolt (16) is provided in a middle portion between the two grooves (61) and between the two raised portions (62). That is, the two grooves (61) or the two raised portions (62) extend in an arrangement direction of a plurality of bolts (16) so as to sandwich the plurality of bolts (16) arranged in the vertical direction.

A sealing member (63) is interposed between the groove (61) and the raised portion (62) in an attachment state. For example, packing or a silicon seal is used as the sealing member (63). The sealing member (63) prevents cool air of the in-compartment space (13) of the trailer (11) from leaking to an outside of the compartment through a gap between the side edge portion (14a) of the trailer (11) and the outside-compartment casing (50).

In the in-compartment space (13), a sealing rubber (64) which is the sealing member is interposed between a side end portion of the in-compartment casing (33) and the side edge portion (14a) of the open section (14) of the trailer (11). Further, silicon is applied to a contact portion of a side end of the outside-compartment casing (50) and the side edge portion (14a) of the trailer (11). In the foregoing manner, the cool air leakage from the in-compartment space (13) to the outside of the compartment is prevented in the attachment portion (60).

<<Operation>>

Figure 8:
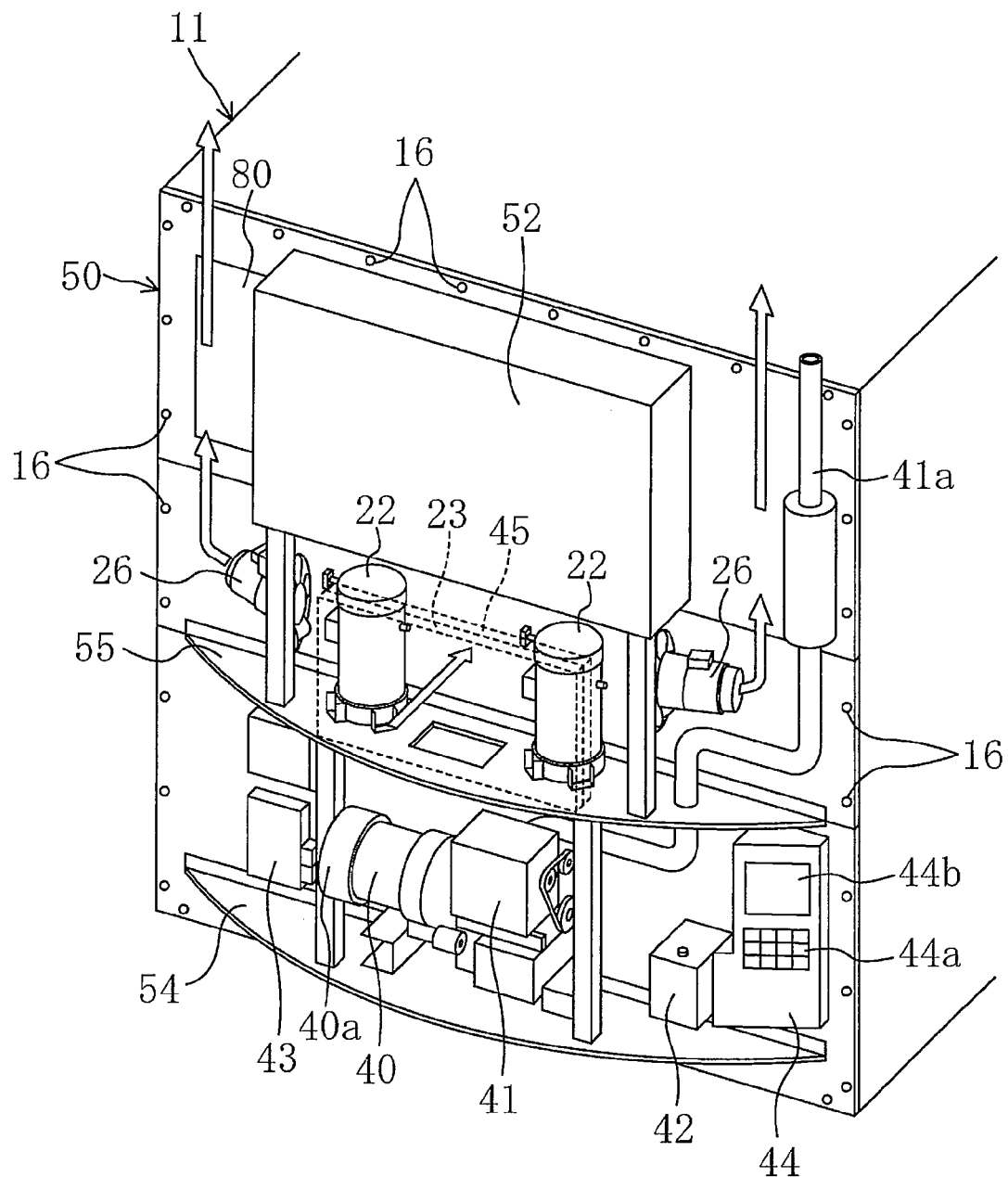
FIG. 8 is a perspective view illustrating the trailer refrigerating apparatus in the state in which the front cover is detached, and illustrates an air flow formed by an outside-compartment fan (26).

Next, an operation of the trailer refrigerating apparatus (20) will be described with reference to FIGS. 4 and 8.

<Cooling of In-Compartment Space (13)>

When the generator (40) is driven by the engine (41), power is generated in the generator (40). Such power is supplied to the electric compressors (22), the outside-compartment fans (26), and the in-compartment fan (27). In the refrigerant circuit (21), the electric compressors (22) are operated to perform the refrigeration cycle.

Specifically, refrigerant compressed in the electric compressors (22) flows through the condenser (23). In addition, the outside-compartment fan (26) rotates in the normal direction. When the outside-compartment fan (26) rotates in the normal direction, outside-compartment air is introduced through the middle inlet (32b) of the front cover (32), and the flow of outside-compartment air toward the condenser (23) is formed as illustrated in FIG. 8. In FIG. 8, the air flow formed by the outside-compartment fan (26) when the outside-compartment fan (26) rotates in the normal direction is indicated by arrows.

In the condenser (23), the refrigerant is condensed by dissipating heat to outside-compartment air. The pressure of the condensed refrigerant is reduced by passing through the expansion valve (24), and the refrigerant after the pressure reduction flows in the evaporator (25). In the evaporator (25), the refrigerant is evaporated by absorbing heat from in-compartment air. The evaporated refrigerant is re-compressed in the electric compressors (22).

When the in-compartment fan (27) is operated, in-compartment air of the in-compartment space (13) is sucked into the internal air flow path (38) through the inlet port (37a). The air sucked into the internal air flow path (38) upwardly flows and passes through the evaporator (25). In the evaporator (25), the in-compartment air is cooled by exchanging heat with refrigerant. The in-compartment air cooled in the evaporator (25) flows in the in-compartment space (13) through the outlet port (37b), and is used for refrigerating/freezing freight etc.

<Defrosting Operation>

When frost is adhered to the evaporator (25) in a refrigerating operation, the defrosting operation is performed. The defrosting operation is performed according to a flowchart of FIG. 9. A process according to such a flowchart is started by inputting a defrosting signal (inputting the defrosting signal by a timer or by manual). At step ST1, a subroutine for determining a defrosting authorization condition is carried out. At step ST2, it is determined whether or not a defrosting condition is satisfied. If the defrosting condition is not satisfied, a signal for a manual operation is cleared at step ST3, and the process returns to step ST1 without defrosting in a state in which a timer operation continues. That is, when a user issues a command for defrosting, if the defrosting condition is not satisfied, the defrosting operation is not performed. When the timer issues the command for defrosting, steps ST1-ST3 are repeated until the defrosting condition is satisfied at step ST2.

As a result of the determination at step ST2, if the defrosting condition is satisfied, the process proceeds to step ST4, and preparation for pump-down performed before the defrosting is performed. At this step, a defrosting lamp indicating a state in which the defrosting operation is about to start or is started is turned on, and the in-compartment fan (27) for sending in-compartment air to the evaporator (25) is stopped. In addition, a defrosting start timer is cleared, and a defrosting completion guard timer is started.

At subsequent step ST5, a pump-down operation is performed to recover a predetermined amount of refrigerant from the evaporator (25) by the condenser (23) and the receiver (133). A reason why the pump-down operation is performed is that, when the hot gas defrosting operation is performed by using all of refrigerant, the inside of the compartment is heated due to an excessive amount of heat from the refrigerant. In the pump-down operation, the inlet proportional valve (135) is fully opened. In addition, the outside-compartment fan (26) rotates in the normal direction with the electric compressor (22) being turned on, thereby forming the flow of outside-compartment air toward the condenser (23) and condensing the refrigerant. Further, the first solenoid valve (liquid solenoid valve) (141) is turned off (closed), the second solenoid valve (economizer solenoid valve) (142) is turned on (opened), and the third solenoid valve (hot gas solenoid valve) (143) is turned off (closed). The second solenoid valve (142) is turned on in order to prevent occurrence of malfunction during the operation.

At step ST6, the hot gas defrosting operation is performed. At this step, the third solenoid valve (143) is turned on (opened) with the electric compressor (22) being turned on. In the hot gas defrosting operation, the controller (150) controls, e.g., an operation of the outside-compartment fan (26) depending on the pressure of refrigerant in the condenser (23) as described later.

(1) In a case where the pressure of refrigerant in the condenser (23) is higher than the threshold, such as a case where an ambient temperature is sufficiently high, the controller (150) stops the outside-compartment fan (26). In such a case, since the pressure of the defrosting pipe (123) is much higher than that of the condenser (23), refrigerant (hot gas) discharged from the electric compressor (22) is less likely to flow toward the condenser (23) and is likely to flow toward the evaporator (25). As in this case, hot gas flows into the evaporator (25), thereby removing frost adhered to the evaporator (25).

(2) In, e.g., a case where the ambient temperature is low, or a case where, while the refrigerated vehicle (10) travels, the trailer (11) (i.e., the trailer refrigerating apparatus (20)) is exposed to a traveling air stream and heat of the condenser (23) is removed by the traveling air stream, there is a possibility that the pressure of refrigerant in the condenser (23) is lower than the threshold even if the outside-compartment fan (26) is stopped. In such a case, in the trailer refrigerating apparatus (20), the controller (150) controls the outside-compartment fan (26) to rotate in the reverse direction. In such a manner, an air flow from the radiator (45) to the condenser (23) is formed, and the condenser (23) is heated by air sent from the radiator (45) to the condenser (23). That is, in the trailer refrigerating apparatus (20), waste heat of the engine (41) is used to heat the condenser (23). This increases the temperature of the condenser (23), thereby increasing the pressure of refrigerant in the condenser (23). When the pressure of refrigerant in the condenser (23) is increased as described above and becomes much higher than that of the defrosting pipe (123), refrigerant (hot gas) discharged from the electric compressor (22) is less likely to flow toward the condenser (23) and is likely to flow toward the evaporator (25). Then, the hot gas flows into the evaporator (25), thereby removing frost adhered to the evaporator (25).

(3) Depending on conditions such as the ambient temperature, the sufficient flow rate of refrigerant flowing into the evaporator (25) may not be ensured even if the outside-compartment fan (26) rotates in the reverse direction and the condenser (23) is heated by heat of the radiator (45). In such a case, there is a possibility that the sufficient defrosting of the evaporator (25) cannot be realized. As described above, the pressure signal representing the pressure of refrigerant in the condenser (23) and the water temperature signal representing the water temperature of the radiator (45) are input to the controller (150), and it can be determined based on the pressure signal and the water temperature signal whether or not a heating capacity of the radiator (45) lacks. Thus, in the trailer refrigerating apparatus (20), the controller (150) controls the rotational speed of the engine (41) depending on the pressure signal and the water temperature signal at step ST6. That is, if it is determined that the heating capacity of the radiator (45) lacks, the controller (150) gradually increase the rotational speed of the engine (41). This increases the temperature of the engine (41) and the water temperature of the radiator (45), thereby increasing the temperature of air sent from the radiator (45) to the condenser (23). As a result, the temperature of the condenser (23) is also increased, thereby increasing the pressure of refrigerant in the condenser (23). As in the foregoing, an increase in pressure of refrigerant in the condenser (23) results in an increase in amount of refrigerant (hot gas) flowing into the evaporator (25), and the sufficient defrosting of the evaporator (25) can be performed.

Next, at step ST7, it is determined whether or not a defrosting completion condition is satisfied. Specifically, the followings are determined in the order of (a), (b), and (c): (a) whether or not a refrigerant temperature at an outlet of the evaporator (25) and a suction air temperature of the evaporator (25) are higher than a preset value; (b) whether or not a defrosting guard timer counts up; and (c) whether or not a protective device (e.g., a high-voltage protective switch) of the compressor is started. If any one of determination results of the three conditions is "yes," the defrosting lamp is turned off at step ST8. After the defrosting guard timer is cleared, the third solenoid valve (143) and a fourth solenoid valve (144) are turned off (closed), and the defrosting operation is completed. Then, the process returns to a normal temperature control.

If the defrosting completion condition is not satisfied at step ST7, the process proceeds to step ST9. At step ST9, a "refrigerant measurement control routine" for adjusting a refrigerant flow rate and performing the defrosting operation is performed.

At step ST10, an injection control during the defrosting operation is performed. Specifically, when a high pressure in the refrigeration cycle exceeds a predetermined value during the defrosting operation, the fifth solenoid valve (146) is first opened, and liquid refrigerant is supplied to the electric compressor (22) through the liquid injection pipe (126). Next, when the discharge temperature of refrigerant falls below a predetermined value, the gas injection is performed, in which refrigerant gas is introduced into the compressor through a low-pressure flow path (gas path) (34b) of the supercooling heat exchanger (134). At this step, it is preferred that the gas injection is performed with the liquid injection pipe (126) being closed. However, the gas injection may be performed with the liquid injection pipe (126) being opened. Subsequently, the process returns to step ST7. Steps ST7, ST9, and ST10 are repeated until the defrosting completion condition is satisfied.

<<Advantages of the Present Embodiment>>

As described above, according to the present embodiment, since the pressure of refrigerant in the condenser (23) is increased in the defrosting cycle, the amount of refrigerant flowing from the electric compressor (22) to the condenser (23) can be decreased. That is, the sufficient amount of refrigerant can be supplied to the evaporator (25) in the defrosting cycle, thereby realizing the efficient defrosting. Thus, the sufficient heating capacity can be expected in, e.g., a case where the ambient temperature is decreased. In particular, in the trailer refrigerating apparatus (20), even when the outside-compartment fan (26) is stopped, if the trailer (11) (i.e., the trailer refrigerating apparatus (20)) is exposed to the traveling air stream generated while the refrigerated vehicle (10) travels, it is likely that heat of the condenser (23) is removed by the traveling air stream and the pressure of the condenser (23) is decreased. However, in the present embodiment, the decrease in pressure of the condenser (23) can be prevented as described above.

In the present embodiment, a discharge pressure adjusting valve is not required, which should be mounted between a compressor and a condenser in a conventional trailer refrigerating apparatus. That is, in the trailer refrigerating apparatus (20) of the present embodiment, cost reduction can be also expected.

<<Other Embodiment>>

<1> An engine control by the controller (engine control section) (150) may include not only an engine control performed depending on the refrigerant pressure as described above, but also a control in which, when, e.g., the water temperature of the radiator (45) is detected, if the detected water temperature is equal to or lower than a predetermined value, the rotational speed of the engine (41) is increased.

Note that the control of the engine rotational speed by the controller (150) is not necessarily performed. For example, when the amount of heat generation of the radiator (45) is the minimum, if the amount of heat for sufficiently heating the condenser (23) can be obtained, the control of the rotational speed of the engine (41) is not necessary.

<2> The outside-compartment fan (26) is not necessarily used as the fan for forming the air flow from the radiator (45) to the condenser (23) as described above, and another fan only for forming such an air flow may be provided. For example, if a fan which does not form an air flow in the reverse direction even if the fan rotates in the reverse direction, such as a turbo fan is employed as the outside-compartment fan (26), another fan only for forming the air flow from the radiator (45) to the condenser (23) is provided to form such an air flow in the defrosting cycle.

<3> In the foregoing example, both of the pressure signal and the water temperature signal are detected to control the rotational speed of the engine (41). However, only either one of the pressure signal or the water temperature signal may be detected to control the rotational speed of the engine (41).

INDUSTRIAL APPLICABILITY

The present invention is useful as the trailer refrigerating apparatus for cooling the in-compartment space of the trailer.

DESCRIPTION OF REFERENCE CHARACTERS

11 Trailer
13 In-Compartment Space
20 Trailer Refrigerating Apparatus
21 Refrigerant Circuit
22 Electric Compressor
23 Condenser
24 Expansion Valve (Expansion Mechanism)
25 Evaporator
26 Outside-Compartment Fan (Fan)
40 Generator
41 Engine
45 Radiator
123 Defrosting Pipe (Hot Gas Introduction Path)
143 Third Solenoid Valve (Switching Valve)
150 Controller (Engine Control Section)

The invention claimed is:

1. A trailer refrigerating apparatus for cooling an in-compartment space of a trailer, comprising:
   a refrigerant circuit which includes an electric compressor, a condenser, an expansion mechanism, an evaporator, a hot gas introduction path connecting the electric compressor and the evaporator together, and a switching valve for controlling a flow of refrigerant in the hot gas introduction path, and which allows a refrigerating cycle for evaporating refrigerant in the evaporator to cool the in-compartment space and a defrosting cycle for introducing refrigerant into the evaporator through the hot gas introduction path to defrost the evaporator;
   a generator configured to supply power to the electric compressor;
   an engine configured to drive the generator;
   a radiator configured to dissipate heat of the engine; and
   a fan,
   wherein the apparatus performs the defrosting cycle by detecting a pressure of the condenser and controlling the fan according to the following operations based on the detected pressure of the condenser:
      a first operation that counteracts the detected pressure of the condenser being equal to or lower than a predetermined threshold by rotating in a direction so as to form an air flow from the radiator to the condenser, and
      a second operation that responds to the detected pressure of the condenser becoming higher than said predetermined threshold by stopping the fan.

2. The trailer refrigerating apparatus of claim 1, wherein the fan is also used as an outside-compartment fan configured to form a flow of outside-compartment air toward the condenser.

3. The trailer refrigerating apparatus of claim 1, further comprising:
   an engine control section configured to control a rotational speed of the engine so that a pressure of refrigerant in the condenser is equal to or higher than a predetermined value.

4. The trailer refrigerating apparatus of claim 1, wherein the fan is disposed relative to the condenser and the radiator such that the air flow that is formed, when the defrosting cycle is performed and the pressure of the condenser is detected to be equal to or lower than the predetermined threshold, proceeds toward the fan from the radiator via the condenser.

* * * * *

UNITED STATES PATENT AND TRADEMARK OFFICE
CERTIFICATE OF CORRECTION

| | |
|---|---|
| PATENT NO. | : 9,134,058 B2 |
| APPLICATION NO. | : 13/375795 |
| DATED | : September 15, 2015 |
| INVENTOR(S) | : Makoto Ikemiya et al. |

It is certified that error appears in the above-identified patent and that said Letters Patent is hereby corrected as shown below:

ON THE TITLE PAGE:

At item (73), Assignee, change "DAIKEN INDUSTRIES, LTD., Osaka (JP)" to

--DAIKIN INDUSTRIES, LTD., Osaka (JP)--.

Signed and Sealed this
First Day of March, 2016

Michelle K. Lee
*Director of the United States Patent and Trademark Office*